(12) United States Patent
Yamaoka et al.

(10) Patent No.: US 6,941,798 B2
(45) Date of Patent: Sep. 13, 2005

(54) SCANNING PROBE MICROSCOPE AND OPERATION METHOD

(75) Inventors: Takehiro Yamaoka, Chiba (JP); Kazutoshi Watanabe, Chiba (JP); Kazunori Ando, Chiba (JP); Yoshiharu Shirakawabe, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 0 days.

(21) Appl. No.: 10/663,302

(22) Filed: Sep. 16, 2003

(65) Prior Publication Data

US 2004/0093935 A1 May 20, 2004

(30) Foreign Application Priority Data

Sep. 17, 2002 (JP) ........................................ 2002-269677
Apr. 22, 2003 (JP) ........................................ 2003-117395

(51) Int. Cl.$^7$ ........................ G01N 13/10; G01N 13/16; G01B 5/28; G12B 21/24
(52) U.S. Cl. ........................................ 73/105; 73/1.89
(58) Field of Search .................. 73/105, 1.89; 250/306; 702/104

(56) References Cited

U.S. PATENT DOCUMENTS 6,005,246 A * 12/1999 Kitamura et al. ........... 250/306
6,038,916 A * 3/2000 Cleveland et al. ............ 73/105
6,189,374 B1 * 2/2001 Adderton et al. ............. 73/105

* cited by examiner

Primary Examiner—Daniel S. Larkin
(74) Attorney, Agent, or Firm—Adams & Wilks

(57) ABSTRACT

A scanning probe is microscope has a cantilever having a probe at a disal end thereof and an oscillator for generating a resonance signal near a resonance of the cantilever. A vibrating device receives the resonance signal as a driving signal for vibrating the cantilever. A variable gain amplifier adjusts a gain of displacement signal corresponding to displacement of the vibrating cantilever so as to satisfy the equation $G=(A/A_0)*G_0$ to control a quality factor value of the cantilever resonance to an optimal quality factor value, where G represents a gain value of the variable gain amplifer, A represents a preselected oscillation amplitude of the oscillator, $A_0$ represents an initial oscillation amplitude of the oscillator, and $G_0$ represents a gain value of the variable gain amplifier when the initial oscillation amplitude of the oscillator is $A_0$.

11 Claims, 10 Drawing Sheets

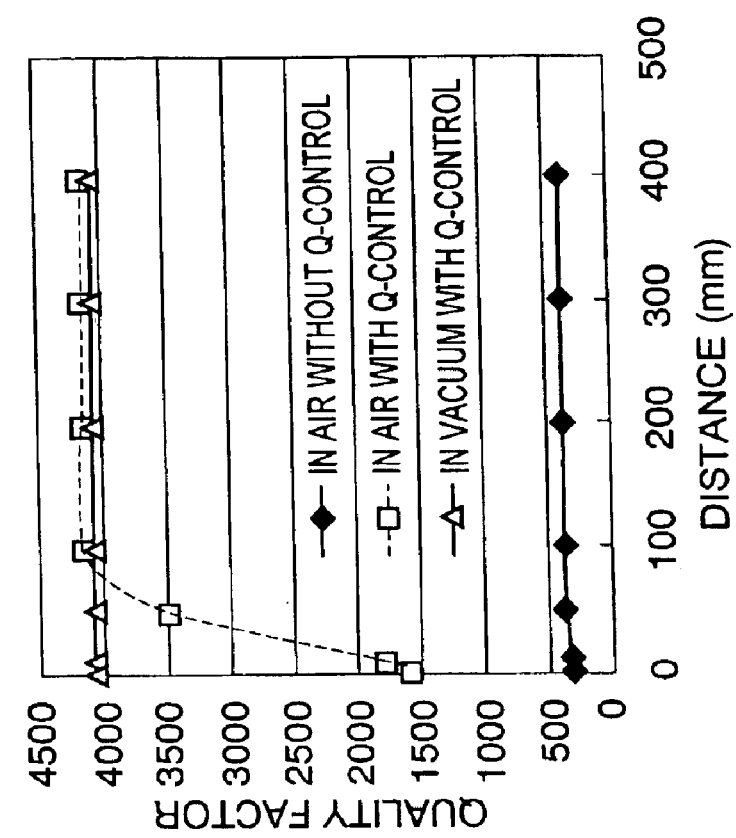
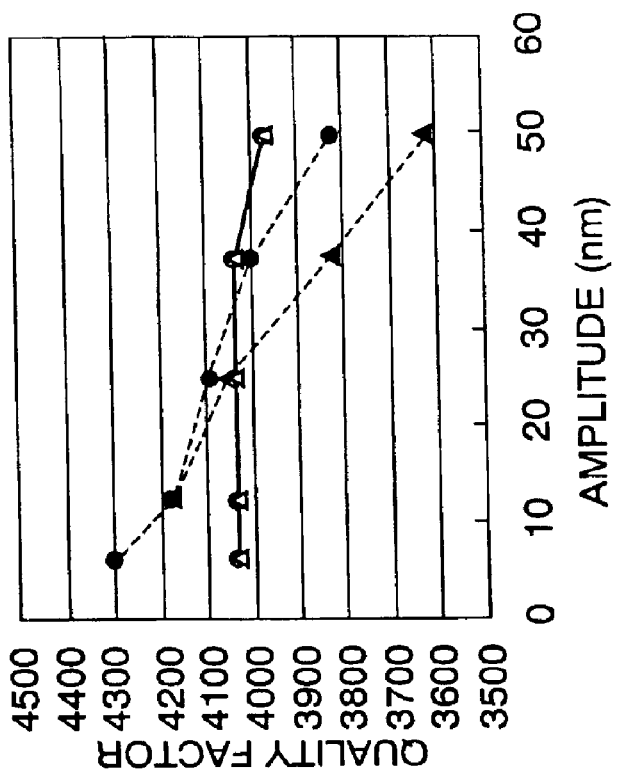

——— : WHEN THERE IS NO FORCE
— — : WHEN THERE IS ATTRACTIVE FORCE
- - - - : WHEN THERE IS REPULSIVE FORCE

Q-CONTROL

SCANNING PROBE MICROSCOPE AND OPERATION METHOD

BACKGROUND OF THE INVENTION

1. Field of the Invention

The present invention relates to a superior scanning probe microscope that changes oscillations of a cantilever having a microscopic probe at a distal end using physical characteristics acting between the probe and a sample surface when the probe approaches the sample while oscillating the cantilever so as to measure shape and physical properties of the surface of the sample.

2. Description of Related Art

Dynamic measurements (Dynamic Force Microscopy: DFM mode) in Scanning Probe Microscopy (SPM) where displacement and other physical quantities are detected while driving a cantilever fitted with a probe at a distal end in the vicinity of it's resonant frequency so as to obtain an image and carry out observation is well-known. With this type of scanning probe microscope in the related art, a cantilever having a microscopic probe at a distal end is fixed to a cantilever holder. Then cantilever is then made to oscillate at a frequency in the vicinity of its resonant frequency by oscillating means employing a piezoelectric element, etc., and the amplitude at this time is measured by displacement detection means. Optical lever methods where the back of the cantilever is a mirrored surface are used as the displacement detection means. A sample is mounted on a stage having a triaxial fine adjustment mechanism constructed from a piezoelectric element, etc., that performs X-Y plane scanning and Z-position adjustment. When the sample comes close to the probe as a result of a coarse adjustment mechanism, when the probe and the sample are sufficiently close, physical forces, such as interatomic forces, act between the sample and the probe. The amplitude of oscillation of the oscillated cantilever therefore changes due to the cantilever being subjected to such physical forces. The force acting at this time depends on the distance between the probe and the sample. When the probe and the sample come within a region where an interatomic force acts, when distance between the sample and the probe is controlled using a Z-position adjustment function so that amplitude of oscillation of the cantilever is normally fixed while scanning within a two-dimensional plane using a fine adjustment mechanism, the extent of this control (displacement) corresponds to the unevenness of the sample surface. A TOPO (uneven shape) image of the sample surface can then be obtained by putting the amount of control during this time into the form of an image.

In the case of performing measurement dynamic (DFM mode) using as scanning probe microscope, a frequency characteristic for the vicinity of the resonance point of the cantilever or probe is obtained (as shown in FIG. 12) prior to the measurement. A resonance frequency $\omega_0$ and a quality factor ("Q") value are obtained for the cantilever and the probe from the waveform for this frequency characteristic. The Q-value can normally be obtained from the following formula;

$$Q = \omega_0 / (\omega_2 - \omega_1)$$

where $\omega_0$ is resonance frequency of the cantilever, $\omega_1$ and $\omega_2$ are frequencies at points of intersection of portions where $A/2^{1/2}$ (note: $2^{1/2}$ expresses the square root of 2) when amplitude of the resonance frequency is taken to be A and a frequency characteristic curve. It can be understood from this equation that Q-value is decided by the width of the resonance point peak and that Q-value is larger for a steeper peak. When the cantilever and probe approach the sample while being oscillated at a frequency in the vicinity of the resonance point, as shown in FIG. 12, the resonance frequency is shifted and the amplitude changes due to interatomic forces between the sample and the probe. When the force acting between the sample and the probe during this time is a force of attraction, the resonance frequency falls, and on the contrary, becomes high in the case of forces of repulsion. With the cantilever and probe, as shown in FIG. 13, the gradient of the waveform is steeper for a larger Q-value. On the other hand, when considering the overall system including the control system, if the Q value is too high, response becomes unstable, the system cannot achieve follow ability and this becomes the cause of oscillation. It is therefore necessary to optimize the Q-value in order to achieve both good response and sensitivity in a dynamic scanning probe microscope system.

However, the Q-value (Q-factor) that is a resonance characteristic typically depends on the mechanical structure of the cantilever, excitation transmission efficiency, and operating environment, etc. In, for example, high-resolution and high sensitivity measurements (Magnetic Force Microscopy: MFM etc. of phase measurements where sensitivity depends on Q-value), measurement takes place with the Q-value raised. However, restrictions are imposed by the mechanical structure of the cantilever and the excitation transmission efficiency that prevent this. Conversely, in dynamic (DFM mode) SPM driving in a vacuum environment, the Q-value can be made in the order of one to two digits higher compared to the atmosphere environment because the influence of the air resistance is dramatically reduced. In this case, this is effective with regards to sensitivity but measurement response falls from the viewpoint of SPM control (the speed of the feedback for tracing the shape). The probe and the sample then collide so as to cause resolution to fall or cause excitation rendering measurement impossible. In order to prevent this it is necessary to dramatically lower the scanning speed, which is problematic in reality and presents many points of difficulty.

With SPM it is possible not just to measure surface shape but also to measure various physical properties synchronously or asynchronously. However, in the related art, as described above, control to perform synchronous measurement (for example, MFM) of a surface shape by lowering Q-value or perform measurements by increasing the Q-value could not be achieved. It was therefore not possible to set optimum conditions for mutually incompatible conditions.

This applicant has therefore previously applied for Japanese Patent Application JP10-148117 (Japanese Patent Laid-open Publication JP11-337560A) entitled "scanning probe microscope" under these conditions. This invention provides a configuration that enables control of a Q-value of a cantilever for a cantilever holder of a scanning probe microscope where the amplitude of oscillation of a cantilever having a microscopic probe at a distal end is made to change using physical characteristics acting between the probe and a sample surface when the probe approaches the sample while oscillating the cantilever so as to measure shape and physical properties of the surface of the sample. To achieve this, a first actuator is fixed to a substrate, and a cantilever is mounted in such a manner that excitation force of the first actuator is transmitted to the cantilever. A flat part of the cantilever then makes contact with a resilient member. A second actuator is then provided at another flat part so as to push the cantilever against the resilient member. This made Q-control possible. However, execution of optimal value control is not straight forward because it is necessary to adjust the mechanical means for pressing the cantilever against the resilient member using the second actuator.

In the paper "Enhanced imaging of DNA via active quality factor control" published by A. D. L. Humphris etc. in the technical journal "Surface Science VOL. 491, No.3, pp. 468–472(2001)", as shown in FIG. 14, a signal is made by passing a displacement detection signal of a cantilever of a dynamically driven SPM through a variable phase-shifter and a variable gain amplifier. This signal is then superimposed with a forced oscillation signal of a conventional oscillator and is applied as an excitation signal. Viscosity is then controlled by a feedback loop passing via the variable phase-shifter and the variable gain amplifier so as to control Q-value. In this non-patent document, an example is introduced of straightforward measurement of DNA etc. where a Q-value that is too low in a fluid is raised.

On homepage of Veeco Instruments (http://www.veeco.com/html/datasheet_nanoscopeIV.asp), an example is introduced of increasing MFM sensitivity through magnetic domain observation of magnetic tapes in the atmosphere through Q-control using a NanoScope IV as an SPM controller.

However, this technology does not describe anything more than simply increasing amplitude of a mechanism resonance point of a cantilever by controlling the Q-value. In this technology, a Q-value (Q-factor) indicating amplitude quality at the mechanical resonance point is prepared (fixed at a desired value) prior to having the probe make an approach to become extremely close to the sample surface. The cantilever (probe) is then brought close to the surface of the sample in the same way as for a conventional SPM. Mutual interaction (attraction, repulsion) with the sample as the probe comes near is then detected, contact is made at a desired extremely weak force, and an image acquisition preparation state is entered. However, the Q-value ($Q_0$) occurring at the distance (referred to as $Z_0$) between the sample surface and the probe when setting the first Q-value falls as the probe approaches the sample. The Q-value then changes as far as $Q_E$ when the approach to the sample is complete (the height is $Z_E$). When the extent of the change in the Q-value during this time is taken to be $\Delta Q$, then $\Delta Q$ is given by the function change in distance ($\Delta Z = Z_0 - Z$). Typically, $\Delta Z$ also tends to be large when $\Delta Q$ is large. The reason for this is that a substantially ideal oscillation amplitude can be obtained at $Z_0$ where the air resistance is small but air resistance with respect to the oscillation becomes larger as the distance between the sample and the probe becomes smaller, the oscillating action of the cantilever is hindered, and the Q-value inevitably falls. Therefore, even though the intention is to set the desired Q value=$Q_0$, when an image is actually being acquired, the Q-value changes to Q-value=$Q_E$, meaning that it is only possible to obtain the resulting $Q_0/Q_E$ for the anticipated Q-value. Namely, even if the Q-value is diligently set high, after an approach this becomes a low Q-value and sensitivity is not improved to the extent anticipated. Further, magnetic force gradient also fluctuates because of variation in the effective Q-value due to carrying out Q-control which presents problems with regards to data reproducibility. This problem is more marked under Q-control MFM under an atmosphere environment, with the extent of these differences also presenting problems broadly speaking to DFM measurements on the whole.

In Q-control MFM of the related art, it is difficult to set a stable desired Q-value when executing measurements. Therefore, even when a high Q-value is set, response is sacrificed and in particular, stability of shape measurement deteriorates. Further, when a low Q-value is set, there is a problem that high sensitivity in measurement of magnetic force gradient is sacrificed.

SUMMARY OF THE INVENTION

The present invention provides a system capable of optimally controlling Q-value in the vicinity of resonance of a cantilever even when atmospheric conditions are changing in a dynamically driven SPM and provide an SPM capable of improving stability of operation during measurement of various physical quantities and improving measurement sensitivity, reproducibility of measurement values, and quantitativity.

The dynamically driven SPM of the present invention adopts a method capable of controlling Q in the vicinity of resonance of a cantilever by controlling Q of a DFM amplitude control signal normally occurring in a drive system for causing a cantilever to be excited as a result of mechanical transmission of oscillations of a piezoelectric element etc. by controlling excitation by passing the cantilever oscillation detection signal through a phase-shifter to give a speed signal, subjecting this signal to variable gain adjustment to give a further signal, and then superimposing this further signal with the excitation signal. The SPM of the present invention is also equipped with an automatic adjustment function for adjusting Q-value according to changes in the environment under changing environmental conditions.

Specifically, with respect to atmospheric changes, when Q-control gain is taken to be $G=G_0$ in the case of controlling $Q=A_0$ using Q-control at a certain oscillation amplitude $A_0$, when an arbitrary oscillation amplitude A is set, the gain of the Q-control is taken to be set to $G=(A/A_0) \times G_0$, so that change in the Q-value is small even when oscillation amplitude changes.

The function for setting an optimal Q-value controls the gain G of the Q-control to be small using the relationship $G \propto 1/L$ as a distance L between the probe and the sample becomes larger so that oscillation is prevented and the Q-control state is easily reproduced. Further, measurement reproducibility is improved and effective Q value after approach is improved so as to enable high-sensitivity measurements to take place by carrying out the steps of: approaching a sample one time without controlling Q value and acquiring a zero point ($Z_E$) for a distance between a sample and a probe; raising the probe by just $\Delta Z$ taking the point ($Z_E$) as an origin, controlling the Q value at this position so as to set the desired Q value; and after a dummy approach, separating the probe and the sample by just a microscopic distance, re-measuring the Q-curve, and making another approach.

Moreover, in an operation method for a scanning probe microscope of the present invention, measurement reproducibility is improved and effective Q value after approach is improved so as to enable high-sensitivity measurements to take place by carrying out the steps of: approaching a sample one time without controlling Q value and acquiring a zero point ($Z_E$) for a distance between a sample and a probe; raising the probe by just $\Delta Z$ taking the point ($Z_E$) as an origin, controlling the Q value at this position so as to set the desired Q value; and after a dummy approach, separating the probe and the sample by just a microscopic distance, re-measuring the Q-curve, and making another approach.

The operation method for the scanning probe microscope of the present invention also comprises a step 1 of measuring a Q-curve, controlling Q=Q1 and taking Q-control parameters (Q control gain etc.) at this time as G=G1, a step 2 of continuously measuring a Q-curve, controlling the Q-value to be Q2 (where Q2>Q1), and taking Q-control parameters (Q-control gain, etc.) at this time as G=G2, a step 3 of setting parameters of G=G1 and measuring shape using a low Q-value of Q=1, and a step 4 of next setting parameters of G=G2 and measuring gradient of magnetic force using a high Q value of Q=Q2. Here, response is improved by performing shape measurements using a low Q by repeating step 3 and step 4 each line or each pixel, and magnetic force gradient sensitivity is improved by measuring magnetic force gradient using a high Q.

The scanning probe microscope of the present invention also comprises extraction means for extracting speed from a vibration detection signal of a cantilever; a variable amplifier for adjusting gain of the signal; an adder for superimposing an output signal of the variable amplifier with an output signal of an oscillator normally occurring in a dynamically driven method for forcing a cantilever to be oscillated by piezoelectric means, for controlling Q in the vicinity of the resonance value of the cantilever by adjusting gain of the variable amplifier, and a phase measurement unit with a phase signal of the cantilever and a reference oscillation output of the oscillator are connected-to input terminals and a phase difference of the signals is detected by the phase measurement unit and outputted as phase data.

A scanning probe microscope of the present invention may also comprise extraction means for extracting speed from a vibration detection signal of a cantilever; a variable amplifier for adjusting gain of the signal; an adder for superimposing an output signal of the variable amplifier with an output signal of a voltage-controlled oscillator forcing a cantilever to be oscillated by piezoelectric means; and a phase comparator for controlling Q in the vicinity of the resonance value of the cantilever by adjusting gain of the variable amplifier, wherein connection is such that a variable detection signal of the cantilever is inputted to one input terminal of the phase comparator, and a reference oscillation output signal from the voltage-controlled oscillator is input to the remaining input terminal, the phase comparator compares phases of the two input signals and outputs a voltage value corresponding to frequency data that is used as frequency data, and is connected so that the voltage value is sent to an input terminal as a voltage control signal for the voltage-controlled oscillator, with Q-value being adjusted to be high so as to enable FM measurements of atomic resolution in the atmosphere.

A scanning probe microscope of the: present invention may also comprise extraction means for extracting speed from a vibration detection signal of a cantilever; a variable amplifier for adjusting gain of the signal; an adder for superimposing an output signal of the variable amplifier with an output signal of an oscillator normally occurring in a dynamically driven method for forcing a cantilever to be oscillated by piezoelectric means, for controlling Q in the vicinity of the resonance value of the cantilever by adjusting gain of the variable amplifier, and a phase comparator and voltage-controlled oscillator connected in such a manner that a variable detection signal of the cantilever is inputted to one input terminal of the phase comparator, and a reference oscillation output signal from the voltage-controlled oscillator is input to the remaining input terminal, the phase comparator compares phases of the two input signals and outputs a voltage value corresponding to frequency data that is used as frequency data, (the phase comparator) is connected so that the voltage value is sent to an input terminal as a voltage control signal for the voltage-controlled oscillator, and the output signal of this voltage-controlled oscillator is used in place of the oscillator as a forced oscillation drive source of the cantilever in frequency measurement mode.

In order to maintain a stable control function, the scanning probe-microscope of the present invention may also comprise a filter for blocking high order frequency components of a fundamental oscillation in a control loop comprising: extraction means for extracting speed from a vibration detection signal of a cantilever; a variable amplifier for adjusting gain of the signal; and an adder for superimposing an output signal of the variable amplifier with an output signal of an oscillator normally occurring in a dynamically driven method for forcing a cantilever to be oscillated by piezoelectric means.

BRIEF DESCRIPTION OF THE DRAWINGS

FIG. 7A is a graph showing a Q-value characteristic with respect to a sample-probe distance, and FIG. 7B is a graph showing a characteristic for a Q-value with respect to an amplitude value.

DETAILED DESCRIPTION OF THE PREFERRED EMBODIMENTS

Figure 1:
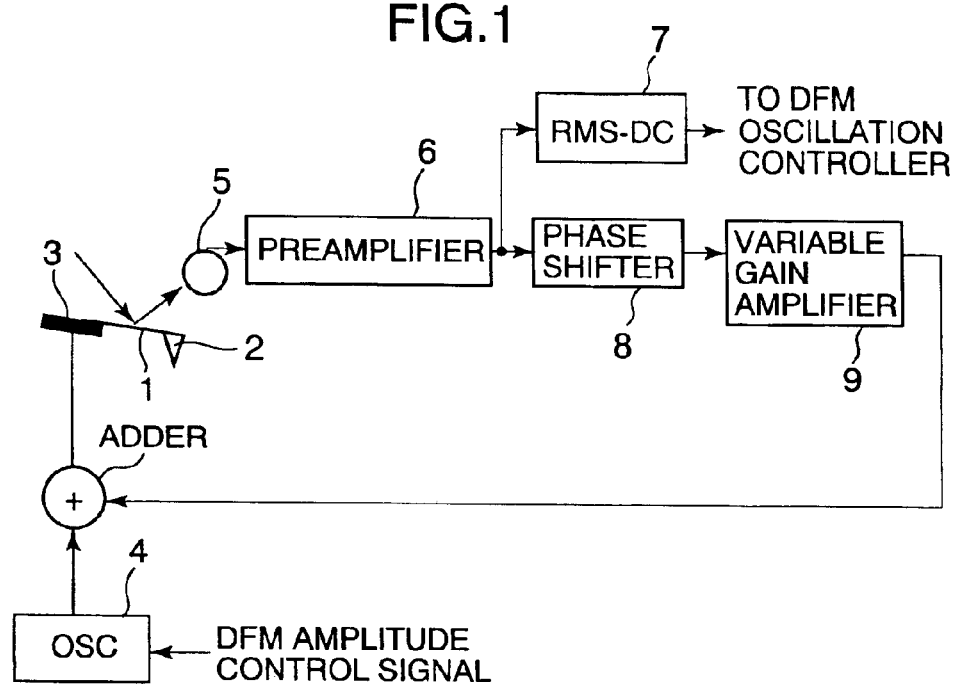
FIG. 1 is a view showing a basic configuration equipped with a Q-control function that is a foundation of the present invention.

The high-resolution scanning probe microscope of the present invention is equipped with a function for controlling Q in the vicinity of resonance of a cantilever, improves stability of operation when measuring various physical quantities, and improves measurement sensitivity, reproducibility of measurement values and quantitativity. First, FIG. 1 shows the basic configuration of a Q-control system executing Q-value (quality factor value) control forming the basis of the present invention, and a description of the theory of operation is given. A cantilever 1 having a microscopic probe 2 at a distal end is fixed to a cantilever holder. A signal of a frequency in the vicinity of the resonance frequency of the cantilever is supplied by the oscillator 4, is received by excitation or vibrating means 3 employing piezoelectric elements, etc., and excites the cantilever 1. The back surface of the cantilever 1 is a mirrored surface and an oscillation amplitude of the cantilever is detected at this time by displacement detection means 5 of a light lever, etc. A displacement signal detected by the displacement detection means 5 is amplified by a preamplifier 6. This signal is a sinusoidal signal and as such can be converted to a direct current signal as a result of a converter 7 subjecting the signal to a root means square conversion. The converted signal is then fed back to the oscillator 4 as a DFM control signal. According to this configuration, a DFM control system is first formed. The Q-control system of the present invention inputs an output signal form the preamplifier 6 to a variable gain amplifier 9 via a phase shifter or converter 8 constituting extracting means. The signal amplified at an appropriate set gain is then first superimposed with the output of the oscillator (OSC) 4 using an adder to make a further signal. This signal is then taken as the drive signal for the excitation means 3. The Q-value is then controlled effectively by adjusting the gain. This corresponds to actively changing the amount of damping due to viscosity of the cantilever.

Next, a description is given of the theory of operation of this Q-control. An equation of motion for the cantilever forcibly oscillated by excitation means such as a piezoelectric element, etc., receiving a drive signal (F(t)=F sin(ωt)) is as follows:

$$md^2Z/dt^2+\eta dZ/dt+kZ=F \sin(\omega t) \quad (1)$$

where m is the mass of the cantilever, η is the coefficient of viscosity, k is the spring constant, and $\omega_0$ is the resonance frequency. The solution of this equation is:

$$Z(t)=Z_0(\omega, \omega_0, F, \eta)\times\sin(\omega t+\delta) \quad (2)$$

where δ is phase shift.

The relationship of the Q-value, coefficient of viscosity η and resonance frequency $\omega_0$ is given by:

$$Q=m\omega_0/\eta \quad (3)$$

In the system shown in FIG. 1, a signal that is a displacement detection signal for the cantilever 1 phase-shifted by n/2 by the phase-shifter 8 is amplified by a gain G set at a variable gain amplifier 9. This signal is then added so as to be superimposed with a sinusoidal forced oscillation signal of the oscillator 4 so as to cause the cantilever to resonate and control the Q-value in an effective manner. Because the displacement detection signal is a sine wave, the signal sin(ωt+Π/2) phase-shifted by just Π/2 corresponds to a differential value, and the equation of motion for the cantilever becomes;

$$md^2Z/dt^2+\eta dZ/dt+kZ=F \sin(\omega t)+G \sin(\omega t+\pi/2)$$

with the term sin(ωt+π/2) being equivalent to dZ/dt. The above equation can therefore be reduced to the following:

$$md^2Z/dt^2+\eta_{eff}dZ/dt+kZ=F \sin(\omega t) \quad (1')$$

where an effective coefficient of viscosity $\eta_{eff}$ during this time is given by the following equation.

$$\eta_{eff}=\eta-G/\omega \quad (4)$$

It can be understood from this equation that the effective coefficient of viscosity $\eta_{eff}$ depends on the value set for the gain and can be adjusted by changing the value G. The effective Q-value ($Q_{eff}$) during this time is given by the following equation.

$$Q_{eff}=m\omega/\eta_{eff} \quad (5)$$

It can be understood from this equation that the effective Q-value ($Q_{eff}$) depends on the effective coefficient of viscosity $\eta_{eff}$. It is therefore also possible for the effective Q-value ($Q_{eff}$) to be adjusted by changing the value G set for the gain.

Further, in addition to amplifying a signal phase-shifted by an amount of change of a cantilever in an oscillatory system by G set at a variable gain amplifier and adding and superimposing this signal with a sinusoidal forced oscillation signal of an oscillator so as to cause a cantilever to oscillate and effectively control the Q-value, the speed of the oscillation of the cantilever is detected and amplified by G set at the variable gain amplifier and is added to and superimposed with a sinusoidal forced oscillation of an oscillator, the cantilever is caused to oscillate, and control is exerted to provide an effective Q-value. In this case, instead of the phase shifter, a differentiator is provided, a speed value dZ(t)/dt is obtained from the cantilever displacement detection value Z(t), this signal is inputted to the variable gain amplifier, and the output is added to and superimposed with the sinusoidal forced oscillation signal of the oscillator. In this case, the equation of motion for the cantilever becomes:

$$md^2Z/dt^2+\eta dZ/dt+kZ=F \sin(\omega t)+GdZ/dt$$

Here, G is the gain set for the variable gain amplifier. Arranging this equation further, we have:

$$md^2Z/dt^2+(\eta-G)dZ/dt+kZ=F \sin(\omega t) \quad (1'')$$

where the effective coefficient of viscosity $\eta_{eff}$ during this time is given by the following equation.

$$\eta_{eff}=\eta-G \quad (4')$$

It can be understood from this equation that the effective coefficient of viscosity $\eta_{eff}$ in this case also depends on the value set for the gain and can be adjusted by changing the amount G. Further, the effective Q-value ($Q_{eff}$) can also be expressed as in the previous case by equation (5), and can also be adjusted by changing the value G set for the gain. Here, since the oscillation of the cantilever is sinusoidal, phase-shifting of π/2-by the phase shifter differentiates the displacement oscillation for speed detection.

The present invention adjusts the Q-value appropriately using the above methods, increases the stability of operation during measurement of various physical quantities, increases measurement sensitivity, and increases measurement quantitativity and several examples of situations of use are shown.

Figure 5:
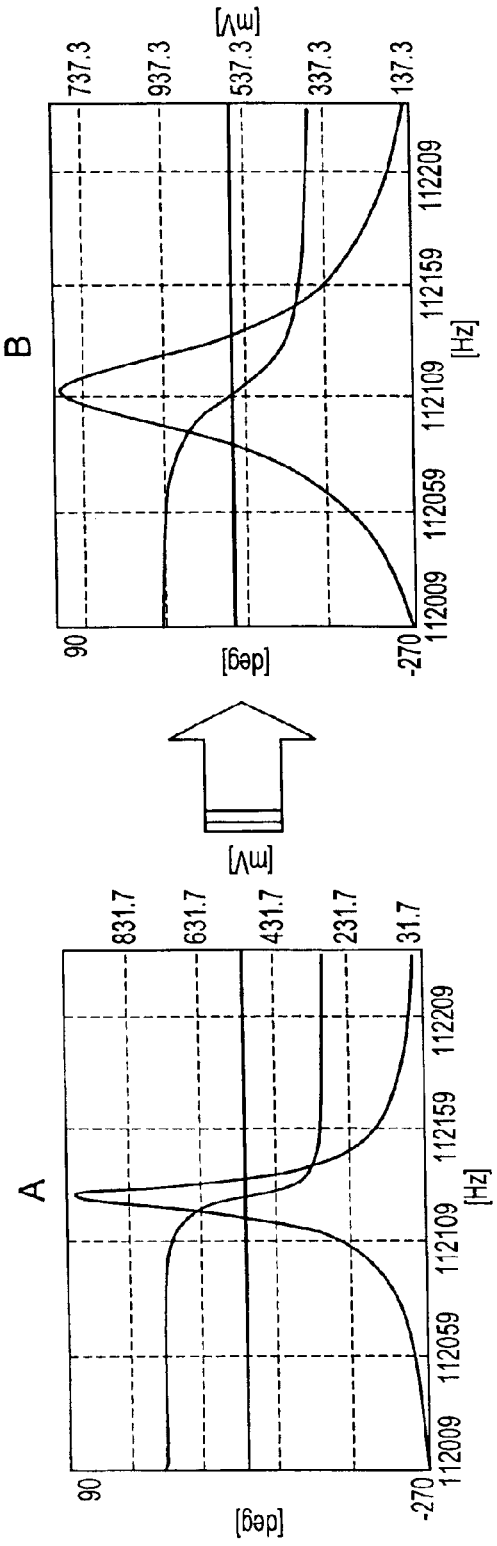
FIG. 5 is a graph showing a characteristic for Q-value and phase with respect to frequency in a vacuum, with FIG. 5A showing when Q-control is present and FIG. 5B showing when Q-control is absent.

In pattern 1, a Q-value becoming excessively high is adjusted to be lowered using this method so as to enable stable measurement. A graph showing the relationship between Q-value and phase with respect to frequency is shown in FIG. 5. As can be understood from this graph, the problematic situation in FIG. 5A, where a characteristic is provided where the Q-value is high at 11000 and phase shifting response is high but there are problems with operation stability due to response and oscillations can be resolved and regulation of operation and sensitivity can be achieved by lowering the Q-value to 3300 using the Q-control as shown in FIG. 5B.

In a pattern 2, adjustment is performed to lower an excessively high Q, shape (TOPO) measurement is carried out, and measurement of other physical quantities such as, for example, MFM and EFM (Electric Force Microscopy) is executed using the same Q-value. Alternatively, the Q-value is made high in atmospheric conditions and sensitivity is increased, the aforementioned TOPO measurements are performed, and other physical-quantities are measured using the same Q-value.

In pattern 3, Q is adjusted under a vacuum, and when TOPO measurement is carried out, Q is lowered, with Q-value then being increased and measurements made when measuring other physical quantities. Namely, the desired Q-value is adjusted in line with the various measurements so as to optimize measurement. The physical measurements in this case are phase measurements and frequency measurements.

Figure 6:
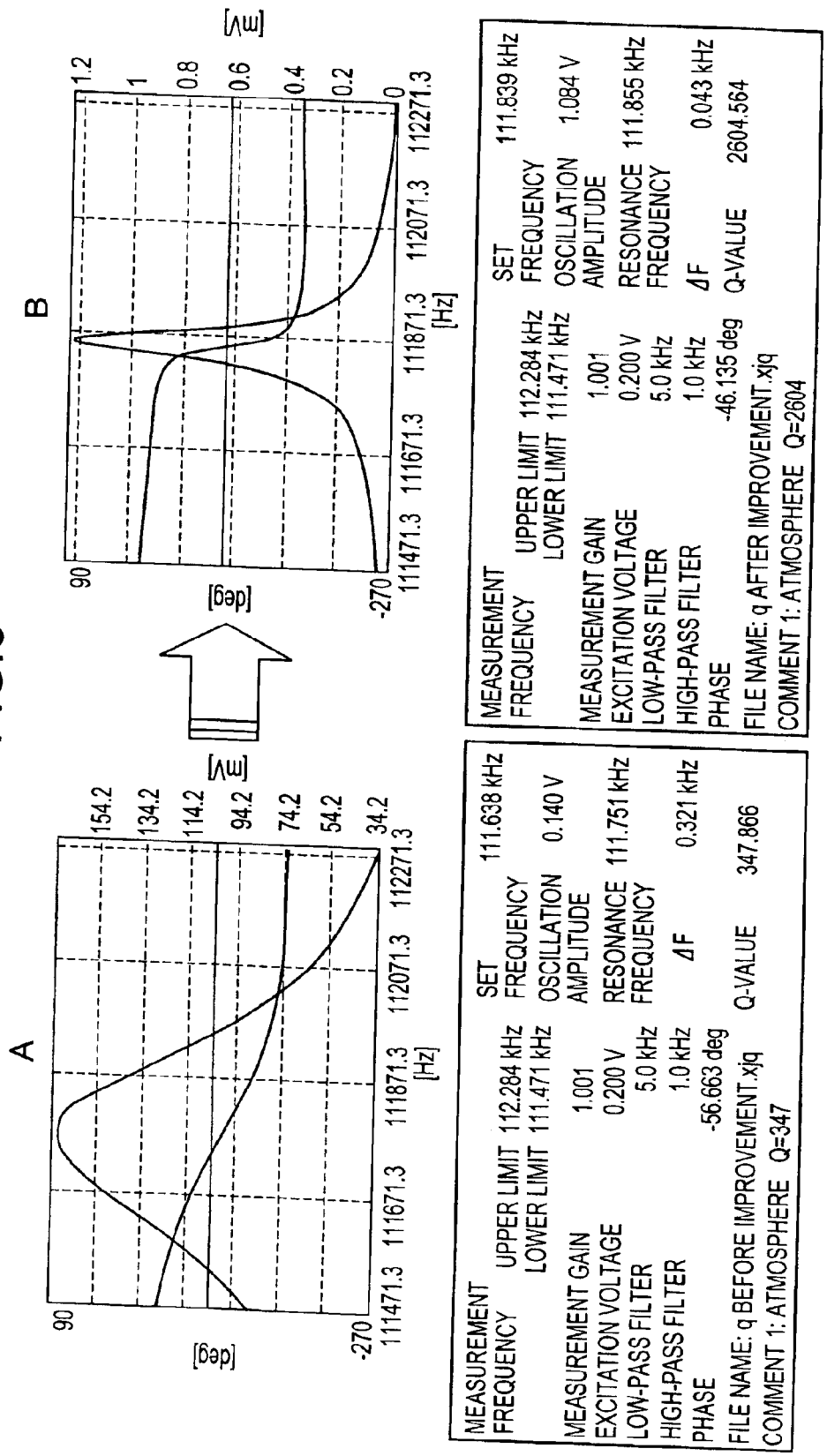
FIG. 6 is a graph showing a characteristic for Q-value and phase with respect to frequency in an atmosphere environment, with FIG. 6A showing when Q-control is present and FIG. 6B showing when Q-control is absent.

Pattern 4 is to enable FM control (frequency mode) in the atmosphere. So-called atomic-resolution FM control is not possible without a large Q-value. However, in the present invention, the Q-value can be adjusted to be high using Q-control methods and FM control in the atmosphere is possible. The relationship between Q-value and phase with respect to frequency in the atmosphere is shown in FIG. 6. The Q-value in the atmosphere is low (347 in this example) as shown in FIG. 6A and the phase characteristic is not sharp. This Q-value is then adjusted to 2604 using the method of the present invention so that, as shown in FIG. 6B, the phase characteristic becomes sharp and the detection sensitivity becomes high.

Figure 2:
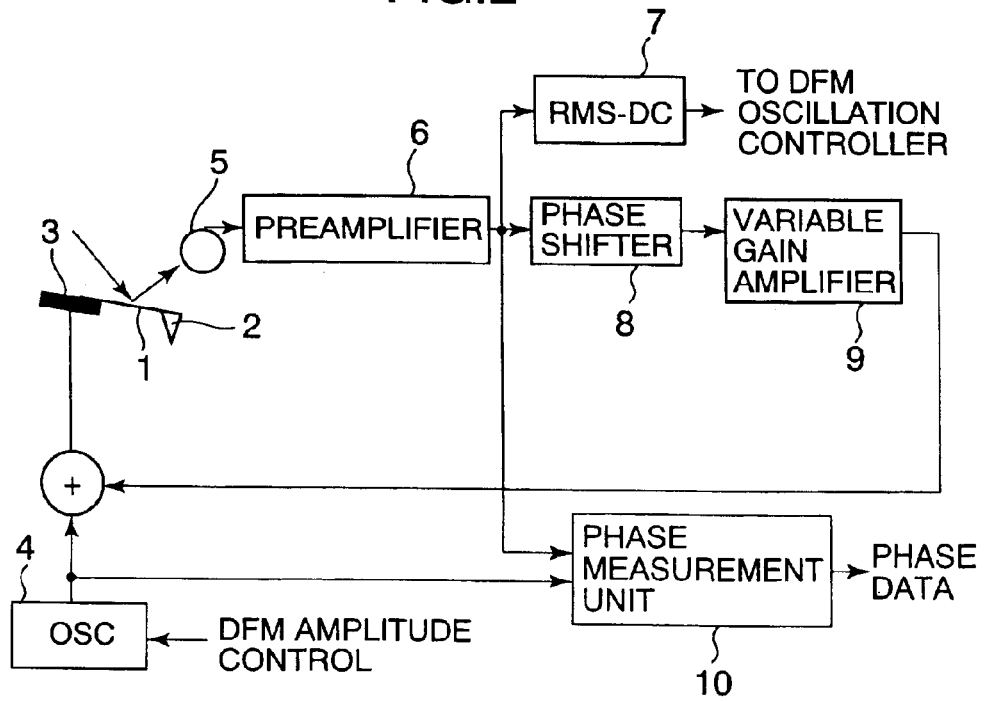
FIG. 2 is a view showing a basic configuration for measuring phase with an SPM equipped with the Q-control function of the present invention.

The block diagram of FIG. 2 shows the basic configuration for the system for patterns 2 and 3 where, under vacuum conditions, adjustment takes place to lower an excessively high Q-value, TOPO measurement is carried out, and phase measurement is executed using the same Q-value, or Q-value is made high and sensitivity increased under atmospheric conditions, TOP measurement is carried out, and phase measurement is executed using the same Q-value. A phase measurement unit 10 is provided in the basic configuration for Q-control of the present invention shown in FIG. 1. A displacement signal for a cantilever amplified by the preamplifier 6 and a reference oscillation output of the oscillator 4 are connected to input terminals of the phase measurement unit 10. The phase difference between the signals is then detected by the phase measurement unit 10 and is outputted as phase data.

Figure 3:
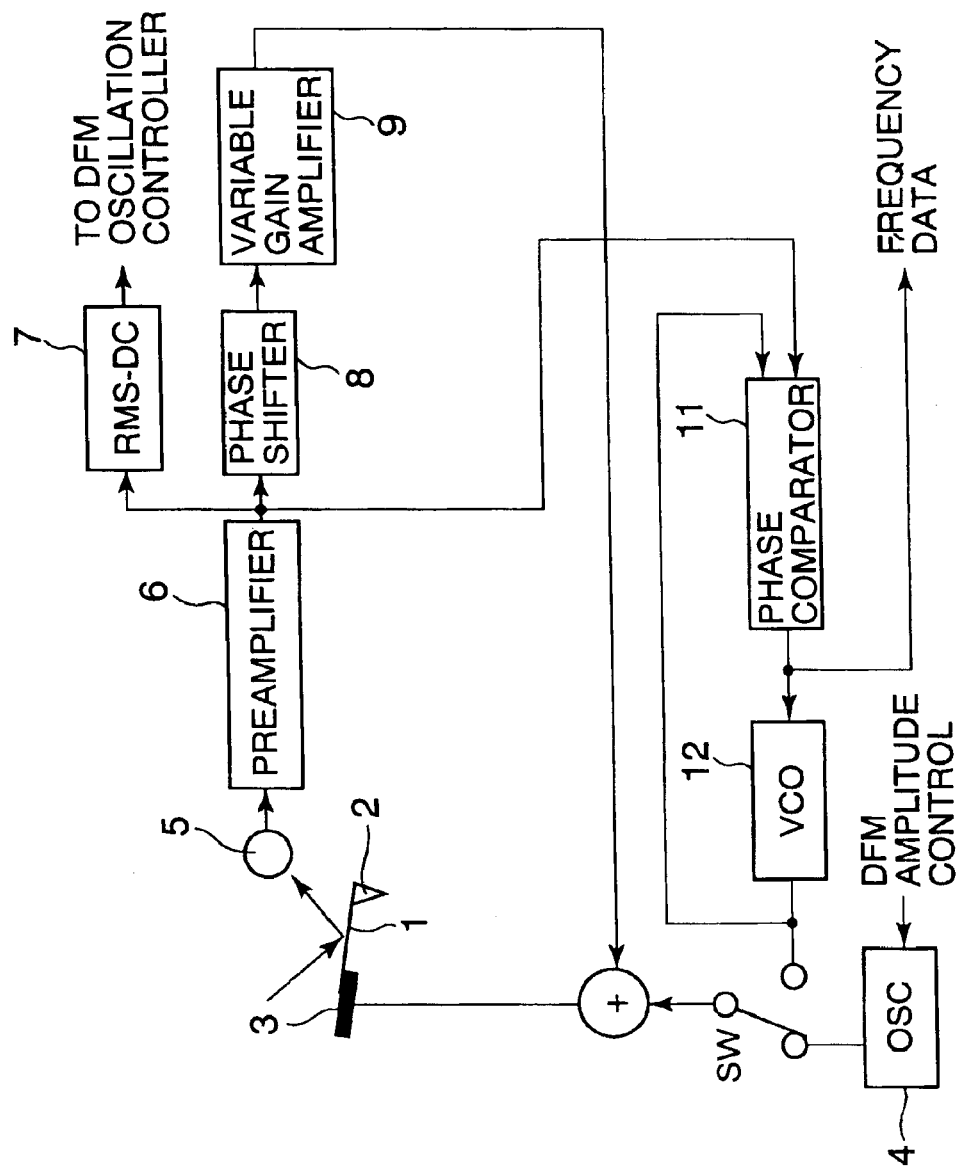
FIG. 3 is a view showing a basic configuration for measuring frequency with an SPM equipped with the Q-control function of the present invention.

The block diagram of FIG. 3 shows the basic configuration for the system for patterns 2 and 3 where, under vacuum conditions, adjustment takes place to lower an excessively high Q-value, TOP measurement is carried out, and frequency measurement is executed using the same Q-value, or alternatively, Q-value is made high and sensitivity is increased under atmospheric conditions, TOPO measurement is carried out, and frequency measurement is executed using the same Q-value. The basic configuration for Q-control of the present invention shown in FIG. 1 is also provided with a phase comparator 11 an a voltage-controlled oscillator (VCO) 12. A displacement detection signal for a cantilever amplified by a preamplifier is input to one input terminal of the phase comparator 11 and a reference oscillation output signal from the VCO 12 is input to the other input terminal. The phase comparator 11 compares the phases of the input signals and outputs voltage values corresponding to frequency data (shifts in resonance frequency). This output is used as frequency data and sent to an input terminal as the voltage VCO 12 is input to the other input terminal of the phase comparator 11 and can be used as the forced oscillation drive source of the cantilever in place of the oscillator 4.

In this system, for example, during TOPO measurement, switch SW is connected to the side of the oscillator 4 and the variable gain under vacuum conditions is put to an appropriate value so as to lower the Q-value. The switch SW is then connected to the side of the VCO 12 during measurement of other physical properties, the variable gain is given an appropriate value, and the Q-value is increased. This VCO 12 is for automatically adjusting amplitude during FM measurement with the phase comparator 11 and the voltage-controlled oscillator (VCO) 12 constituting a feedback loop of a DFM oscillation control system. In addition to the above configuration in an actual circuit configuration, it is also possible to provide an adjustment phase-shifter between the preamplifier 6 and the phase comparator 11 in order to have oscillation of the overall system itself.

Figure 4:
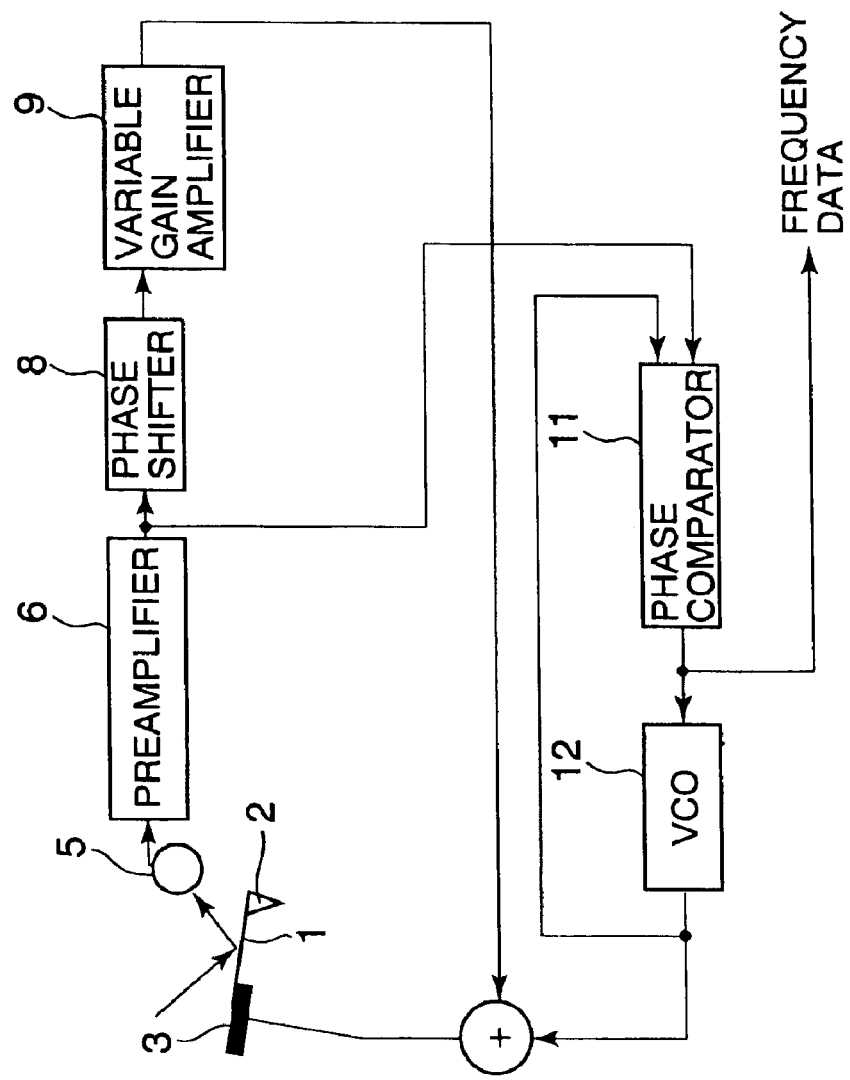
FIG. 4 is a view showing a basic configuration for a system capable of measuring frequency in the atmosphere with an SPM equipped with the Q-control function of the present invention.

FIG. 4 is a block view showing a basic configuration for a system for pattern 4, i.e. capable of frequency measurement under atmospheric conditions. This system does not employ an oscillator 4 but rather carries out forced oscillation of the cantilever using the VCO 12. The configuration is that of the DFM amplitude control system shown in FIG. 3 with the feedback loop including the oscillator 4 omitted. With just this configuration, it is possible to adjust the Q-value to be high using the Q-control method of the present invention so as to enable FM control of a molecular resolution in the atmosphere.

Next, a description is given of methods for dealing with problems occurring when executing appropriate measurement with Q-values set to desired values using the system of the present invention. In atmospheric MFM of the related art, viscous resistance of air has a substantial influence on the probe-sample distance and the oscillation amplitude of the lever. The effective Q-value is therefore substantially dependant on settings for environment and conditions and there is a problem that reproducibility of measurement results is poor. There are also problems regarding oscillation and stability in vacuum MFM of the related art when the Q-value is too high. The present invention is capable of appropriately controlling Q-value so that the Q-value can be controlled to be lowered under vacuum conditions with respect to this problem to enable the use of MFM. In this case, there is no dependence on air and the Q-value therefore substantially does not change with respect to changes in the probe-sample distance and oscillation amplitude of the lever. FIG. 7A shows a graph comparing values for the case where Q-control is carried out under vacuum conditions for changes in Q-value with respect to the probe-sample distance, values where Q-control is not carried out under atmospheric conditions, and values where Q-control is carried out under atmospheric conditions. FIG. 7B shows a graph comparing values for the case where Q-control is carried out under vacuum conditions for changes in Q-value with respect to amplitude, values where Q-control is not carried out under atmospheric conditions, and values where Q-control is carried out under atmospheric conditions. It can be understood from this characteristic that by using this method it is possible to provide a magnetic domain monitoring method where reproducibility of measurement results can be easily confirmed and vacuum MFM reproducibility is also good.

With Q-control of the related art, when the Q-value is initially being set, the Q-value ($Q_0$) occurring at the probe-sample distance (referred to as $Z_0$) falls as the probe approaches the sample, and changes to $Q_E$ (height $Z_E$) when the approach to the sample is complete. When the extent of the change in the Q-value during this time is taken to be $\Delta Q$, then $\Delta Q$ is given by the function change in distance ($\Delta Z = Z_0 - Z$). Typically, $\Delta Z$ also tends to be large when $\Delta Q$ is large. The reason for this is that, with respect to obtaining a substantially ideal oscillation amplitude in the state $Z_0$ where there is little vacuum resistance, the vacuum resistance becomes larger as the sample-probe distance becomes smaller. This hinders the oscillating operation of the cantilever and makes a fall in the Q-value inevitable. As a result, a difference occurs in the Q-value and is changed to $Q=Q_E$ when acquiring an actual image in order to set the desired Q-value (=$Q_0$). This means that only $Q_0/Q_E$ can be obtained as results for the anticipated Q-value.

In MFM control of the related art, shape measurement is carried out using amplitude modulation (AM) techniques and magnetic force gradient measurements are carried out by performing detection using AM, phase modulation (PM) or frequency modulation (FM) techniques in lift mode. However, in the case of Q-control at locations where the probe-sample distance is comparatively large, increases in viscosity due to changes in distance after an approach reduce the effective Q-value. Therefore, even if a high Q-value is set, this Q-value falls after the approach, and there is the problem that sensitivity cannot be increased. Further, magnetic force gradient also fluctuates because of variation in the effective Q-value due to carrying out Q-control which presents problems with regards to data reproducibility. The above problem is more marked under Q-control MFM under an atmosphere environment, with the extent of these differences also presenting problems broadly speaking to DEFM measurements on the whole.

In order to avoid the above problem, it is preferable to set the Q-value (=$Q_0$) for small probe-sample distances so that AZ is as small as possible. Specifically, if the probe is made close to the sample in advance in such a manner that $\Delta Z=1$ $\mu$m or less, than $\Delta Q$ becomes small and it is also possible for the loss (drop) in the Q-value shown by $Q_0/Q_E$ to be suppressed. However, this is extremely difficult because there is a danger that the probe will collide with the sample when the probe is brought up close as far as this region manually. The present invention therefore avoids this problem with the following procedure. Namely:

1) The sample is approached once (without performing Q-control) and a point where the distance between the sample and the probe is zero ($Z_E$) is acquired.

2) The probe is raised by just $\Delta Z$ taking the point ($Z_E$) as a reference, Q-value control is carried out at this position, and a desired Q-value is set.

Here Z has to be larger than a value that is half ($A_0/2$) the value of the oscillation amplitude of the cantilever (causing a collision because of the amplitude). However, it is preferable for $\Delta Z$ to be a minimum. Normally, $\Delta Z=(A_0/2)+\alpha$, and if $\alpha$ is limited, then it is preferable to keep this to 2 $\mu$m or less.

In a typical oscillation amplitude system it is typical for DFM operation to take place at the resonance frequency $F_0$ at the mechanical resonance point. However, it is also possible for operation to take place using a frequency that is a multiple of $F_0$ rather than at $F_0$, or at a completely different oscillation frequency. The approach method may be a usual DFM method or an AFM (statically driven) method. In scanning tunnel microscope (STM) that is a combination of a metal sample and a conductive probe, scanning thermal microscope (SThM) that is thermal mutual interaction, or an approach method that is a combination of any of the current SPM modes is possible.

3) Further, after an approach, the probe and sample are separated by a microscopic distance, the Q-curve is measured again, and an approach is made again.

By adopting this method, measurement reproducability can be improved, and high-sensitivity measurements are possible by improving the effective Q-value after an approach.

Further, in the Q-control MFM of the related art, after carrying out Q-control at a certain lever oscillation amplitude, when the oscillation amplitude is changed for whatever reason such as, for example, matching with the surface conditions of the sample, there are no problems caused by changes in Q due to changes in viscosity resistance due to oscillation amplitude. The following method is therefore proposed by the present invention with respect to this problem. Namely, when the lever oscillation amplitude is made large, the Q-value is reduced, and conversely, when the lever oscillation amplitude is made small, the Q-value is increased. At a certain oscillation amplitude $A_0$, the gain is taken to be $G=G_0$ for Q-control in the case of controlling $Q=A_0$ using Q-control. In the case of setting an arbitrary oscillation amplitude A, the Q-control gain is set to, for example, a value decided by the relational expression $G=(A/A_0) \times G_0$ so that changes in the Q-value are made as small as possible even if the oscillation amplitude changes. By adopting this method, fluctuations in Q-value occurring in amplitude adjustment can be made small. In particular, when the amplitude is small, the effective Q also becomes large causing inconveniences such as oscillation, but these kinds of problems can be-alleviated by using the above means.

With related Q-control MFM, there is the problem that response is sacrificed when a high Q-control is set, and in particular, stability when measuring waveforms is lost, while when a low Q-value is used, high sensitivity of measurement of magnetic force gradient is sacrificed. In order to resolve problems relating to Q-value in Q-control MFM of the related art, the present invention provides a method of providing control so that shape measurement is performed at a low Q-value, and magnetic force gradient measurements are carried out at a high Q-value. Namely, 1) A Q-curve is measured, control is exerted to put $Q=Q1$, and the Q-control parameters (Q-control gain etc.,) at this time is taken to be $G=G1$.

2) A Q-curve is then continuously measured, control is exerted to put the Q value to Q2 (where Q2>Q1), and the Q-control parameters (Q-control gain etc.,) at this time are taken to be $G=G2$. Hereinafter. Q1 will be referred to as "low Q-value" and Q2 will be referred to as "high Q-value", which represent that the Q2 is higher than Q1.

3) The parameters are set to $G=G1$, and waveform measurement is carried out using a low Q-value of $Q=Q1$.

4) Next, the parameters are set to $G=G2$ and measurement of magnetic force gradient is carried using $Q=Q2$.

5) Next, 3) and 4) above are repeated for each line or for each pixel.

By adopting this method, response is improved by carrying out waveform measurements with a low Q-value, and sensitivity regarding magnetic force gradient is improved by carrying out magnetic force gradient measurements with a high Q-value.

With Q-control MFM of the related art, after Q-control is carried out at a certain probe-sample distance, when it is necessary to pull the probe and sample away from each other for whatever reason such as changing a sample, etc., increases in the probe-sample distance are reduced by viscosity resistance so that the effective Q-value becomes large. Because of this, a signal detecting speed is extracted from a lever displacement signal and when this is fed back as a forced oscillation signal, oscillation is easily induced and depending on the case, excessive oscillation may be applied to the lever, the state of fixing with the lever holder is changed, and reproducibility of the Q-control state cannot be achieved. With respect to this problem, when a certain lever is pulled away in the Q-control state, means are provided for controlling Q-control gain according to this distance. Namely, 1) A dummy approach is made without performing Q-control.

2) The probe and sample are separated by just a certain microscopic distance.

3) Q-control is carried out when again taking Q-curve measurements.

4) Another approach is made, and Q-control MFM measurement is carried out.

5) Control is exerted (, for example, $G \propto 1/L$) so that the gain G of the Q-control becomes small as the distance between the probe and sample. L becomes large when changing the sample, etc.

By adopting this method, oscillation is prevented and the Q-control state is easily reproduced.

Figure 8:
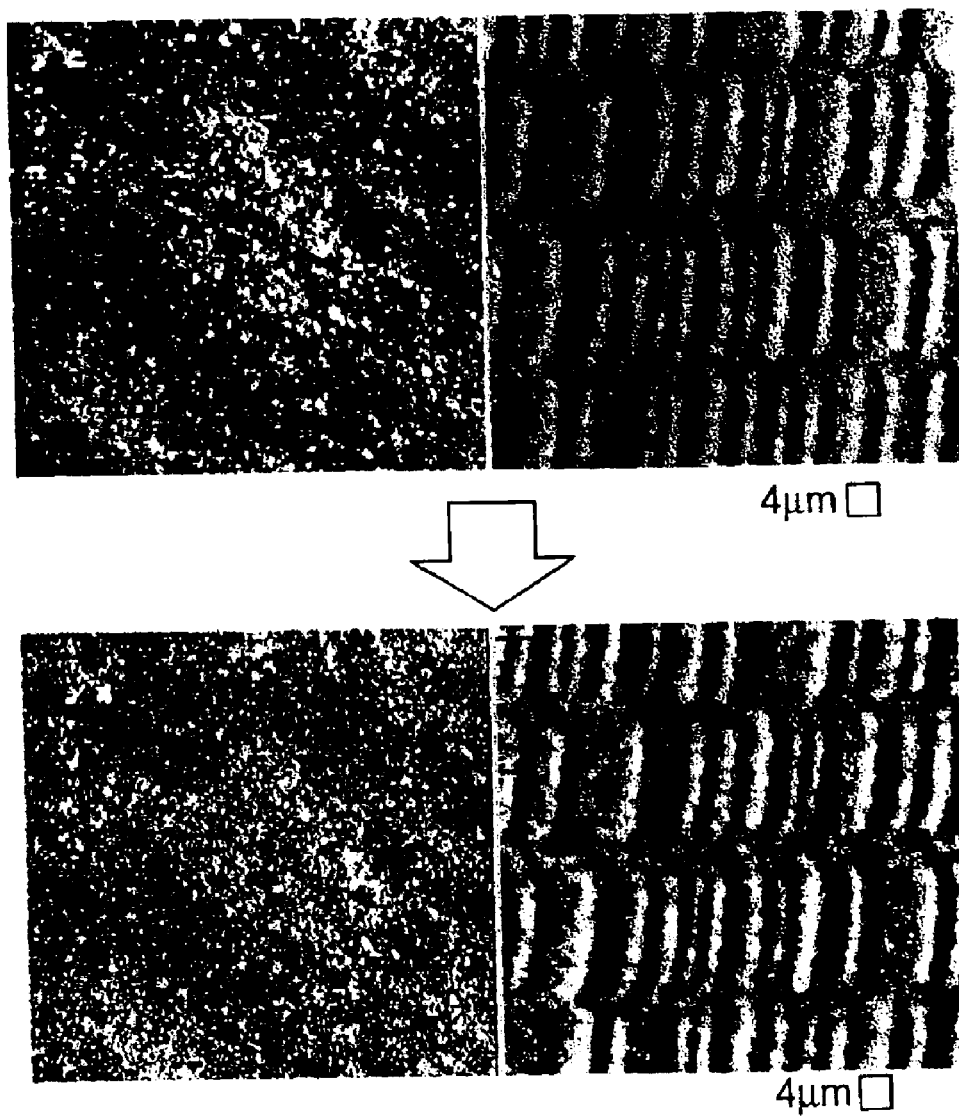
FIG. 8 is a demonstrative example showing optimizing of a Q-value by a method of the present invention to obtain a clearly visible microscopic image.

The following is a demonstrative example showing the optimization of a Q-value by a method of the present invention to obtain a clearly visible microscopic image. The upper part of FIG. 8 shows observations made for the surface of a hard disc in the atmosphere using SPM (at a Q-value of 400), with the left side being a TOP image, and the right side being a magnetic image for a region having 4 $\mu$m sides. With regards to this, the lower part shows observations made using SPM exerting Q-control with a Q-value raised to 2000, where the left side is a TOPO image for the same 4 $\mu$m region as the upper part, and the right side being a magnetic image of the same. As becomes clear from this comparison, there is not a significant difference in the TOPO image even if the Q-value is made high, but a markedly clearer image is obtained with high resolution for the magnetic image.

Figure 9:
FIG. 9 is a microscope image observed for a soft sample using a high-moment probe.
Figure 10A:
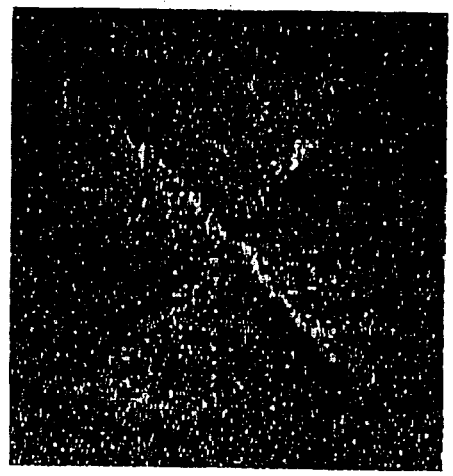
FIGS. 10–10B show a comparative view of a microscope image observed for a soft sample using a low moment probe where Q-control is not performed.
Figure 10B:
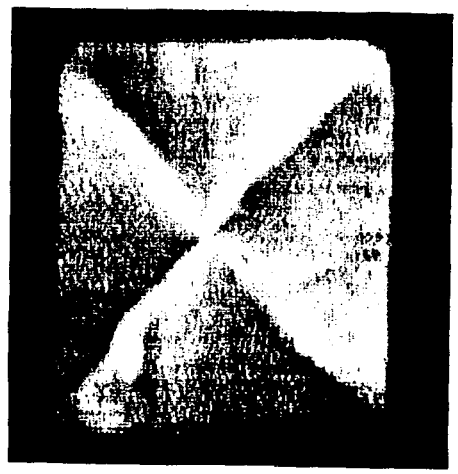

Further, FIG. 9 shows an MFM image observed in the atmosphere using a general-purpose high-moment probe taking a perm alloy thin film as a sample. The perm alloy thin-film is a soft material, mutual interaction of the magnetism of the surface sample and magnetism of the probe then influences the high-moment probe, detection disturbance occurs due to probe magnetization, a center cross-line is formed, but cannot be distinguished. This sample monitored using a low moment probe is shown in FIG. 10. FIG. 10A is an image using a low Q-value (Q=400) without controlling the Q-value, and FIG. 10B is an image observed exerting Q-control with Q=3000. The microscope image of FIG. 10A is unclear and a cross-shape is not formed at the center, while the microscopic image of FIG. 10B is a clear image where a cross-shape is not formed at the center. It can be confirmed that a high-sensitivity MFM image can be obtained using Q-value optimization under atmospheric conditions.

When a process of acquiring measurements for samples using a scanning probe microscope of the present invention actually takes place, it can be understood that inappropriate operation of the original Q-control rarely occurs, but that this occurs more easily when a soft cantilever of a low spring constant is used. In analyzing this phenomena, it can be understood that this occurs because when a soft cantilever is excited, oscillations at high-order frequencies other than the fundamental frequency become superimposed, the high-order frequency oscillations are detected by the displacement detector 5, and a speed component is extracted by a phase detector 8 and is fed back to the adder via the variable gain amplifier 9. The fundamental frequency of the resonance frequency of the silicon cantilever of a nano-sensor on the market of a spring constant of 3N/m, and the high-order resonance frequency is in the order of 100 to 150 KHz. A phenomenon where the oscillation amplitude in this resonance state is larger than the fundamental component occurs occasionally. In the case of using the cantilever of the present invention, a signal fed back to the adder via the phase detector 8 and the variable gain amplifier 9 corresponds to a harmonic wave.

Figure 11:
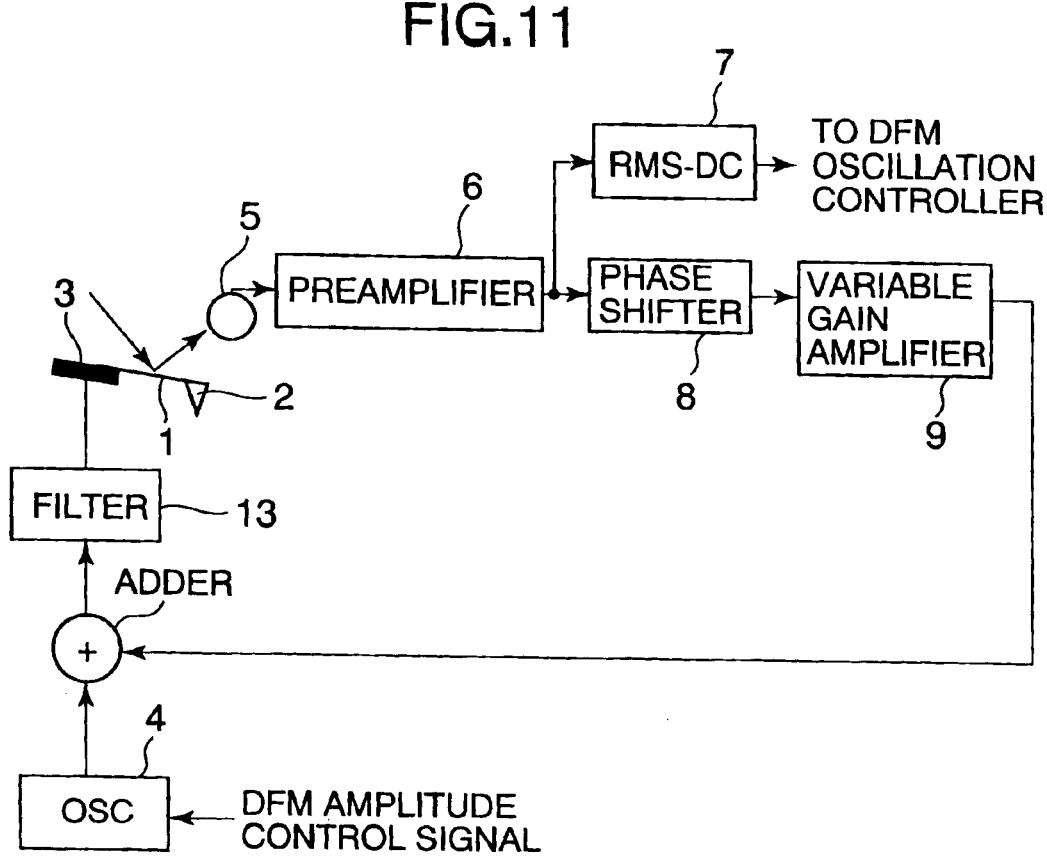
FIG. 11 is a view showing an embodiment of a superior SPM of the present invention.
Figure 12:
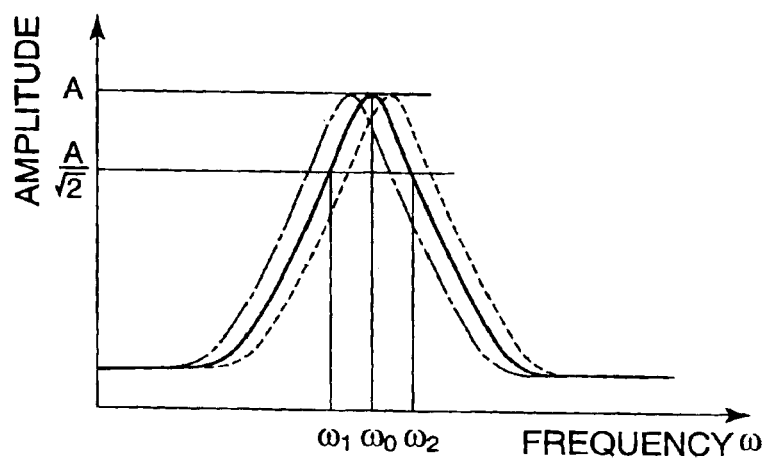
FIG. 12 is a graph illustrating the relationship between resonance frequency $\omega_0$ and Q value for a cantilever or probe.
Figure 13:
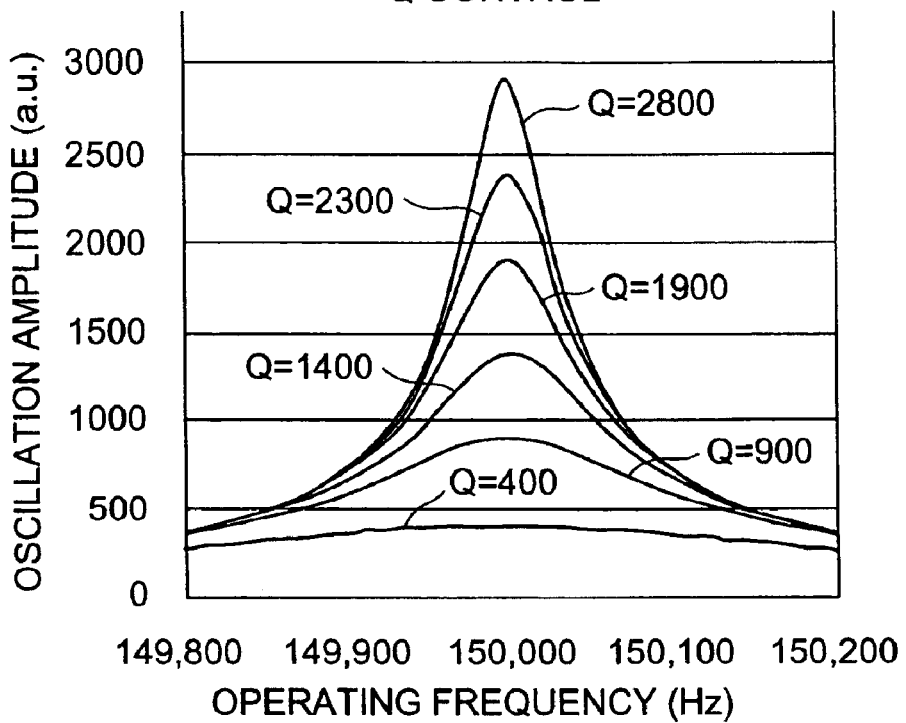
FIG. 13 is a graph illustrating characteristics for frequency and oscillation amplitude corresponding to Q-values.
Figure 14:
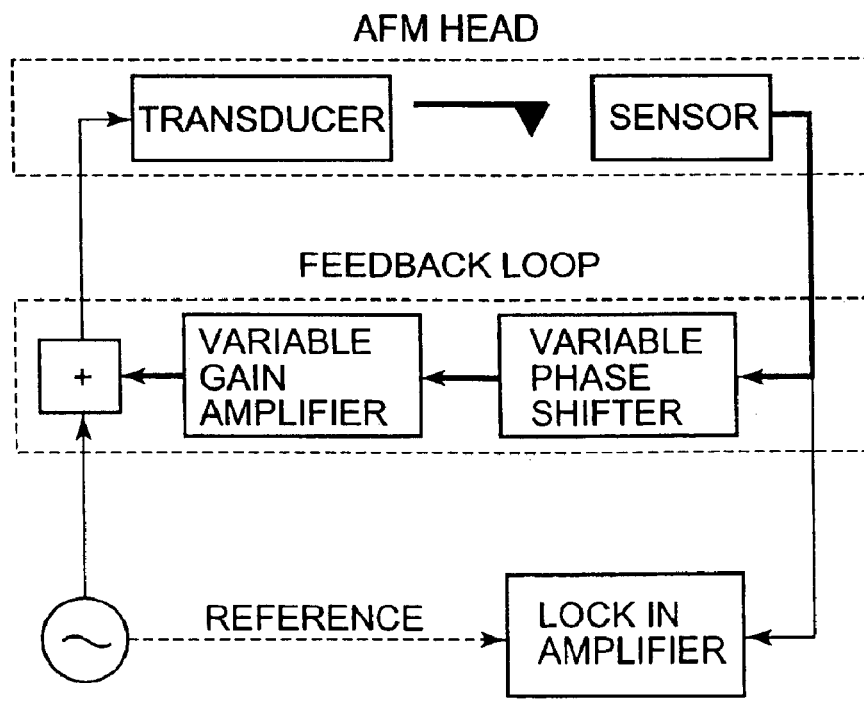
FIG. 14 is a view showing a publicly known basic configuration equipped with a Q-control function that is a foundation of the present invention.

In order to resolve this problem, the present invention gives consideration to providing a filter for blocking high-order frequency components in the feedback loop as shown in FIG. 11. Therefore, even if high-order oscillations are superimposed ot the cantilever for reasons such as, for example, disturbances, as a result of the action of this filter, this does not pass through a feedback system so as to cause resonance, and a state of resonance due to the fundamental wave can be maintained. In the example shown in FIG. 11, a configuration is shown where a low pass filter or band pass filter 13 is provided between the adder and the cantilever excitation means 3, and just the fundamental wave component is input to the excitation means 3. However, erroneous operation can also be prevented by providing hte low pass or band pass filter between the variable gain amplifier 9 and the adder.

The present invention is capable of exerting control so as to optimize Q-value in the vicinity of resonance of the cantilever under changing environmental conditions. High-sensitivity and high-resolution measurements that were not possible in the related art are therefore possible. Further, measurement under various optimal conditions is possible by setting control parameters including respective optimal Q-values when acquiring various different physical quantities using SPM, and two-way ultra-high sensitivity and resolution measurement is possible under various optimal conditions. Reliable Q-control is possible by automating the technical points appearing on this occasion, extremely high quantitativity is possible, and measurement with high reproducibility is possible.

The dynamically driven SPM of the present invention adopts a method capable of controlling Q in the vicinity of resonance of a cantilever by controlling Q of a DFM amplitude control signal normally occurring in a drive system for causing a cantilever to be excited as a result of mechanical transmission of oscillations of a piezoelectric element etc. by controlling excitation by passing the cantilever oscillation detection signal through a phase-shifter to give a speed signal, subjecting this signal to variable gain adjustment to give a further signal, and then superimposing this further signal with the excitation signal. The SPM of the present invention is also equipped with an automatic adjustment function for adjusting Q-value according to changes in the environment under changing environmental conditions. This means that extremely high quantitativity is possible, and measurement with high reproducibility is possible. Specifically, the gain of the Q-control is set to be $G=(A/A_0) \times G_0$, so that changes in Q-value are small even if the oscillation amplitude changes, Q-control gain G is controlled to be small using the relationship $G \propto 1/L$ in accordance with the size of the probe-sample distance L, oscillation is prevented, and the Q-control state can be easily reproduced. Further, measurement reproducibility is improved and effective Q value after approach is improved so as to enable high-sensitivity measurements to take place by carrying out the steps of: approaching a sample one time without controlling Q value and acquiring a zero point ($Z_E$) for a distance between a sample and a probe; raising the probe by just $\Delta Z$ taking the point ($Z_E$) as an origin, controlling the Q value at this position so as to set the desired Q value; and after a dummy approach, separating the probe and the sample by just a microscopic distance, re-measuring the Q-curve, and making another approach.

By providing a filter for blocking high order frequency components of a fundamental oscillation in a control loop comprising a scanning probe microscope comprising: extraction means for extracting speed from a vibration detection signal of a cantilever; a variable amplifier for adjusting gain of the signal; and an adder for superimposing an output signal of the variable amplifier with an output signal of an oscillator normally occurring in a dynamically driven method for forcing a cantilever to be oscillated by piezoelectric means, it is possible to prevent a signal corresponding to a high-order frequency component from being superimposed, and stable Q-control can be realized.

What is claimed is:

1. A scanning probe microscope comprising:
   a cantilever having a probe at a distal end thereof;
   an oscillator for generating a resonance signal near a resonance of the cantilever;
   vibrating means connected to receive the resonance signal generated by the oscillator as a driving signal for vibrating the cantilever while the probe is in close proximity to a surface of a sample;
   extracting means for extracting a displacement signal corresponding to displacement of the cantilever during vibration thereof;
   a variable gain amplifier for adjusting a gain of the displacement signal extracted by the extracting means so as to satisfy the equation $G=(A/A_0)*G_0$ to control a quality factor value of the cantilever resonance to an optimal quality factor value, where G represents a gain value of the variable gain amplifier, A represents a preselected oscillation amplitude of the oscillator, $A_0$ represents an initial oscillation amplitude of the oscillator, and $G_0$ represents a gain value of the variable gain amplifier when the initial oscillation amplitude of the oscillator is $A_0$; and
   an adder for superimposing an output signal from the variable gain amplifier with an output signal from the oscillator to generate a signal for use as the driving signal received by the vibrating means for vibrating the cantilever.

2. A scanning probe microscope according to claim 1; wherein the vibrating means comprises a plurality of piezoelectric elements.

3. A scanning probe microscope according to claim 1; further comprising displacement detection means for detecting an oscillation amplitude of the cantilever during vibration thereof corresponding to the displacement signal.

4. A scanning probe microscope according to claim 3; further comprising a preamplifier for amplifying the displacement signal and for outputting the amplified displacement signal to the variable gain amplifier via the extracting means.

5. A scanning probe microscope according to claim 4; wherein the extracting means comprises a phase shifter.

6. A scanning probe microscope comprising:
   a cantilever having a probe at a distal end thereof;
   an oscillator for generating a resonance signal near a resonance of the cantilever;
   vibrating means connected to receive the resonance signal generated by the oscillator as a driving signal for vibrating the cantilever while the probe is in close proximity to a surface of a sample;
   extracting means for extracting a displacement signal corresponding to displacement of the cantilever during vibration thereof;
   a variable gain amplifier for adjusting a gain of the displacement signal extracted by the extracting means so as to satisfy the expression $G \propto 1/L$ to control a quality factor value of the cantilever resonance to an optimal quality factor value, where G represents a gain value of the variable gain amplifier and L represents a distance between the probe and the sample; and
   an adder for superimposing an output signal from the variable gain amplifier with an output signal from the oscillator to generate a signal for use as the driving signal received by the vibrating means for vibrating the cantilever.

7. A scanning probe microscope according to claim 6; wherein the vibrating means comprises a plurality of piezoelectric elements.

8. A scanning probe microscope according to claim 7; further comprising displacement detection means for detecting an oscillation amplitude of the cantilever during vibration thereof corresponding to the displacement signal.

9. A scanning probe microscope according to claim 8; further comprising a preamplifier for amplifying the displacement signal and for outputting the amplified displacement signal to the variable gain amplifier via the extracting means.

10. A scanning probe microscope according to claim 9; wherein the extracting means comprises a phase shifter.

11. A method of operating a scanning probe microscope having a cantilever probe with a probe tip at a distal end thereof for scanning a surface of a sample, comprising the steps of:
    displacing the cantilever probe so that the probe tip approaches the surface of the sample;
    acquiring a point corresponding to a first position of the cantilever probe at which a distance between the probe tip and the surface of the sample is zero;
    displacing the cantilever probe to a second position different from the first position using the acquired point as a reference by raising the probe tip to a first distance from the surface of the sample;
    controlling at the second position of the cantilever probe a quality factor value of the resonance of the cantilever probe to an optimal quality factor value;
    displacing the cantilever probe to a third position different from the second position so that probe tip is disposed at a second distance from the surface of the sample different from the first distance; and
    controlling at the third position of the cantilever probe a quality factor value of the resonance of the cantilever probe to an optimal quality factor value.

* * * * *